US012663582B2

(12) United States Patent
Kataoka et al.

(10) Patent No.: US 12,663,582 B2
(45) Date of Patent: Jun. 23, 2026

(54) OPTICAL WAVEGUIDE ELEMENT, AND OPTICAL MODULATION DEVICE AND OPTICAL TRANSMISSION DEVICE WHICH USE SAME

(71) Applicant: SUMITOMO OSAKA CEMENT CO., LTD., Tokyo (JP)

(72) Inventors: Toshio Kataoka, Tokyo (JP); Norikazu Miyazaki, Tokyo (JP)

( * ) Notice: Subject to any disclaimer, the term of this patent is extended or adjusted under 35 U.S.C. 154(b) by 273 days.

(21) Appl. No.: 18/284,270

(22) PCT Filed: Mar. 30, 2022

(86) PCT No.: PCT/JP2022/015881
§ 371 (c)(1),
(2) Date: Sep. 26, 2023

(87) PCT Pub. No.: WO2022/210854
PCT Pub. Date: Oct. 6, 2022

(65) Prior Publication Data
US 2024/0168225 A1     May 23, 2024

(30) Foreign Application Priority Data
Mar. 30, 2021    (JP) ................................ 2021-058774

(51) Int. Cl.
*G02B 6/122*          (2006.01)
*G02B 6/12*           (2006.01)
(52) U.S. Cl.
CPC .... *G02B 6/122* (2013.01); *G02B 2006/12097* (2013.01); *G02B 2006/12142* (2013.01)

(58) Field of Classification Search
CPC ..................................................... G02B 6/122
See application file for complete search history.

(56) References Cited

U.S. PATENT DOCUMENTS

| | | |
|---|---|---|
| 2002/0186743 A1 | 12/2002 | Tani |
| 2012/0318964 A1 | 12/2012 | Takanori |
| 2014/0185978 A1 | 7/2014 | Liao |
| 2015/0253472 A1 | 9/2015 | Kumar |
| 2017/0131618 A1 | 5/2017 | Miller |
| 2018/0284352 A1 | 10/2018 | Miyazaki |
| 2018/0329269 A1 | 11/2018 | Ward |
| 2019/0162984 A1 | 5/2019 | Sugiyama |

FOREIGN PATENT DOCUMENTS

| | | | |
|---|---|---|---|
| JP | 2002350613 | A | 12/2002 |
| JP | 2009237325 | A | 10/2009 |
| JP | 5359750 | B | 4/2011 |
| JP | 201175917 | A | 4/2011 |
| JP | 20133224 | A | 1/2013 |
| JP | 2017524981 | A | 8/2017 |
| JP | 2018173594 | A | 11/2018 |
| JP | 2018534627 | A | 11/2018 |
| JP | 201995698 | A | 6/2019 |

*Primary Examiner* — Tina Wong
(74) *Attorney, Agent, or Firm* — IpHorgan Ltd.

(57) ABSTRACT

An optical waveguide device that can efficiently remove a high-order mode light beam and that is also easily manufactured even in a case where a width or a height of an optical waveguide is small is provided. An optical waveguide device includes a substrate 1 on which a rib type optical waveguide 10 is formed, and a slab waveguide SW disposed close to the rib type optical waveguide 10, in which roughness of at least a part (SF1) of an upper surface of the slab waveguide SW is larger than roughness (SF0) of a surface of a top portion of the rib type optical waveguide.

11 Claims, 3 Drawing Sheets

FIG. 1     (Prior Art)

OPTICAL WAVEGUIDE ELEMENT, AND OPTICAL MODULATION DEVICE AND OPTICAL TRANSMISSION DEVICE WHICH USE SAME

CROSS REFERENCE TO RELATED APPLICATIONS

This application is a national stage completion application of PCT Application No. PCT/JP2022/015881, filed Mar. 30, 2022, and claims priority from Japanese Patent Application No. 2021-058774 filed Mar. 30, 2021. Each of these applications is incorporated by reference herein in its entirety.

TECHNICAL FIELD

The present invention relates to an optical waveguide device, and an optical modulation device and an optical transmission apparatus using the same, and particularly to an optical waveguide device including a substrate on which a rib type optical waveguide is formed.

BACKGROUND ART

In the field of optical measurement technology or in the field of optical communication technology, optical waveguide devices such as an optical modulator using a substrate on which an optical waveguide is formed have been widely used. While the optical waveguide can be formed by thermally diffusing Ti or the like in the substrate of lithium niobate (LN) or the like having an electro-optic effect, a rib type optical waveguide obtained by forming a protruding rib portion on a surface of the substrate has also been proposed. Particularly, in the rib type optical waveguide, since a difference in a refractive index between the rib portion and a space (air) around the rib portion can be increased, confinement of light can be strengthened.

In Patent Literature No. 1, the present applicant has proposed a method of attenuating a high-order mode while suppressing a loss of a fundamental mode with respect to a light wave propagating through the rib type optical waveguide. Specifically, it has been proposed to provide a slab waveguide SW near a rib type optical waveguide 10 as illustrated in FIG. 1 and to set a height h of the slab waveguide SW to be lower than a height H of the rib type optical waveguide 10. Elliptical dotted line OW illustrates a mode field diameter (MFD) of the light wave in a simplified manner.

Meanwhile, there has been increasing need for a high-frequency and small-size optical modulator. A driver-integrated type optical modulation device in which a driver circuit (amplifier) for amplifying an electrical signal is integrated into a case accommodating the optical waveguide device has been proposed.

In the case of integrating the amplifier into the case, the amplifier is disposed on one end side of the optical waveguide device. Thus, in the optical waveguide formed on the substrate, it is required to dispose an input port and an output port of the optical waveguide together on one end surface (an end surface on a side opposite to the amplifier) of the substrate. Thus, since it is required to employ a structure folded by at least 180 degrees as an overall shape of the optical waveguide, it is required to further strengthen confinement of light in the optical waveguide.

As a method of strengthening confinement of light in the optical waveguide, a width or a height of the optical waveguide is set to 1 µm or less. In the case of accurately disposing the slab waveguide SW close to the rib type optical waveguide 10 together with setting the height h of the slab waveguide SW to be lower than 1 µm in Patent Literature No. 1, manufacturing is significantly difficult. In addition, the dimension disclosed in Patent Literature No. 1 is the MFD of the light wave propagating through the optical waveguide, which is set to approximately 10 µm, and this dimension causes the optical waveguide to have multiple modes and poses a problem in that a high-order mode light beam cannot be completely removed.

CITATION LIST

Patent Literature

[Patent Literature No. 1] Japanese Patent No. 5359750

SUMMARY OF INVENTION

Technical Problem

An object to be solved by the present invention is to solve the above problem and to provide an optical waveguide device that can efficiently remove a high-order mode light beam and that is also easily manufactured even in a case where a width or a height of an optical waveguide is small. In addition, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.

(1) An optical waveguide device includes a substrate on which a rib type optical waveguide is formed, and a slab waveguide disposed close to the rib type optical waveguide, in which roughness of at least a part of an upper surface of the slab waveguide is larger than roughness of a surface of a top portion of the rib type optical waveguide.

(2) In the optical waveguide device according to (1), the slab waveguide includes a first slab waveguide that is close to the rib type optical waveguide and that has a lower height than the rib type optical waveguide, and roughness of an upper surface of the first slab waveguide is set to be large.

(3) In the optical waveguide device according to (1), the slab waveguide includes a first slab waveguide that is close to the rib type optical waveguide and that has a lower height than the rib type optical waveguide, and a second slab waveguide that is disposed close to the first slab waveguide on a side opposite to the rib type optical waveguide and that has a higher height than the first slab waveguide, and roughness of an upper surface of the second slab waveguide is set to be large.

(4) In the optical waveguide device according to (3), roughness of an upper surface of the first slab waveguide is set to be the same as the roughness of the upper surface of the second slab waveguide.

(5) In the optical waveguide device according to any one of (1) to (4), the first slab waveguides are disposed on both sides of the rib type optical waveguide.

(6) In the optical waveguide device according to any one of (1) to (5), the first and second slab waveguides of the slab waveguide are disposed on both sides of the rib type optical waveguide.

(7) In the optical waveguide device according to any one of (1) to (6), the slab waveguide is disposed near an input port, a branching part, or a multiplexing part of the rib type optical waveguide.

(8) In the optical waveguide device according to any one of (1) to (7), an input port and an output port of the rib type optical waveguide are disposed on the same end surface of the substrate, a photo detection unit that detects a light wave propagating through the rib type optical waveguide or radiation light radiated from the rib type optical waveguide is provided on the substrate, and the slab waveguide is provided between the input port and the photo detection unit.

(9) An optical modulation device includes the optical waveguide device according to any one of (1) to (8) including an electrode that modulates a light wave propagating through the rib type optical waveguide, a case accommodating the optical waveguide device, and an optical fiber through which the light wave is input into the rib type optical waveguide or output from the rib type optical waveguide.

(10) In the optical modulation device according to (9), an electronic circuit that amplifies a modulation signal to be input into the optical waveguide device is provided inside the case.

(11) An optical transmission apparatus includes the optical modulation device according to (9) or (10), and an electronic circuit that outputs a modulation signal causing the optical modulation device to perform a modulation operation.

Advantageous Effects of Invention

In the present invention, an optical waveguide device includes a substrate on which a rib type optical waveguide is formed, and a slab waveguide disposed close to the rib type optical waveguide, in which roughness of at least a part of an upper surface of the slab waveguide is larger than roughness of a surface of a top portion of the rib type optical waveguide. Thus, a high-order mode of the light wave propagating through the rib type optical waveguide can be efficiently removed by scattering the high-order mode using the part corresponding to the rough surface.

BRIEF DESCRIPTION OF DRAWINGS

FIG. 1 is a cross section view for describing a structure of an optical waveguide device in the related art.

DESCRIPTION OF EMBODIMENTS

Figures 2, 3, 4:
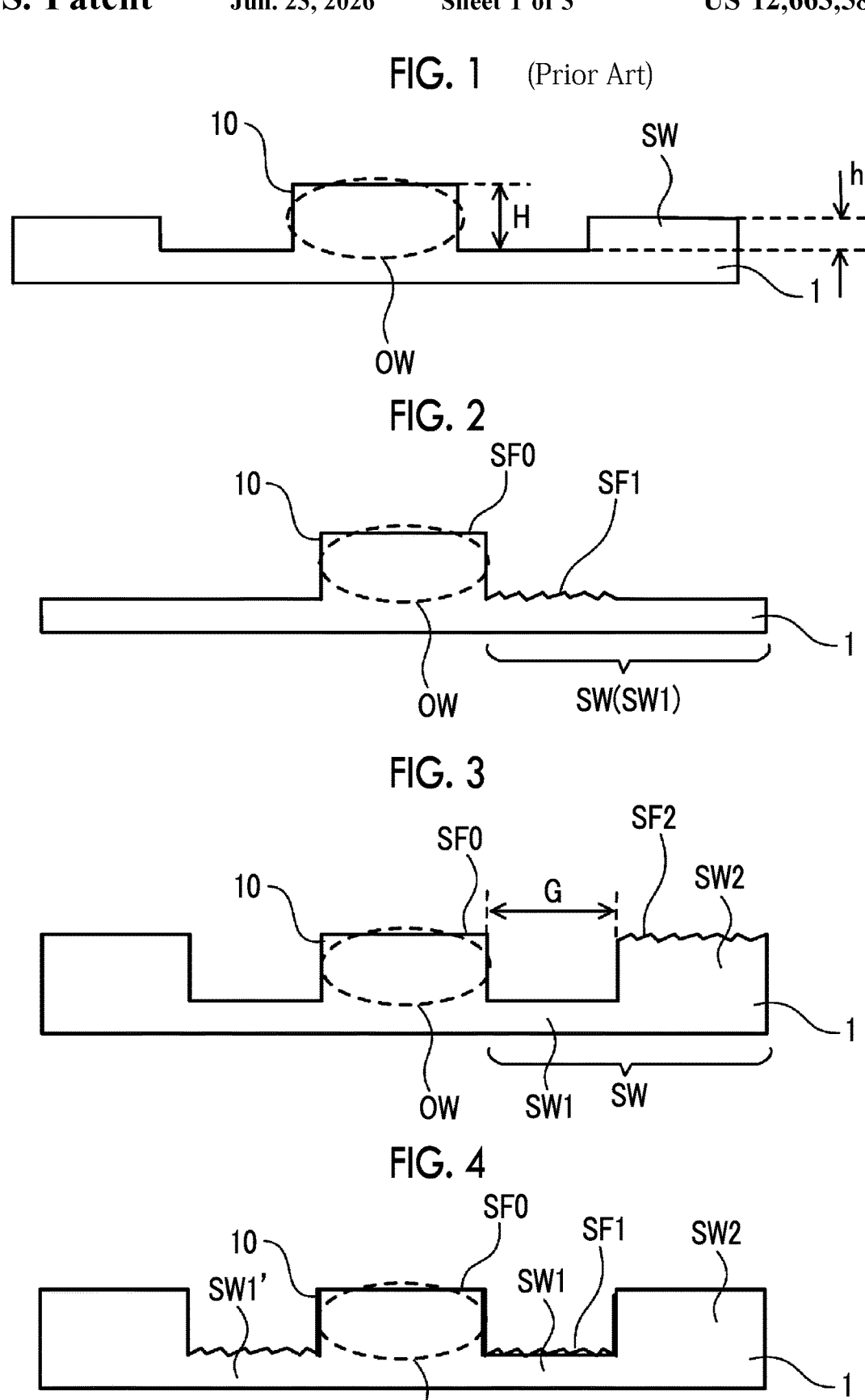
FIG. 2 is a cross section view for describing a first example related to an optical waveguide device of the present invention.
FIG. 3 is a cross section view for describing a second example related to the optical waveguide device of the present invention.
FIG. 4 is a cross section view for describing a third example related to the optical waveguide device of the present invention.

Hereinafter, an optical waveguide device of the present invention will be described in detail using preferred examples.

As illustrated in FIGS. 2 to 5, the optical waveguide device of the present invention includes a substrate 1 on which a rib type optical waveguide 10 is formed, and a slab waveguide SW disposed close to the rib type optical waveguide 10, in which roughness of at least a part (SF1, SF2) of an upper surface of the slab waveguide SW is larger than roughness (SF0) of a surface of a top portion of the rib type optical waveguide.

As a material of the substrate 1 used in the optical waveguide device of the present invention, a substrate of a ferroelectric material having an electro-optic effect, specifically lithium niobate (LN), lithium tantalate (LT), lead lanthanum zirconate titanate (PLZT), or the like, a vapor-phase growth film formed of these materials, or the like can be used. In addition, various materials such as semiconductor materials or organic materials can also be used as the substrate of the optical waveguide device.

A thickness of the substrate 1 on which the optical waveguide is formed may be set to 10 μm or less, preferably 5 μm or less, and more preferably 2 μm or less in order to achieve velocity matching between a microwave of a modulation signal and a light wave. In this case, a holding substrate 11 having a thickness of 0.2 to 1 mm is bonded via direct bonding or through an adhesive to reinforce mechanical strength of the substrate 1.

In the optical waveguide device of the present invention, the "substrate on which the optical waveguide is formed" does not simply mean only one substrate and is a concept also including a bonded body of a thin plate (for example, has a thickness of 10 μm or less) on which the optical waveguide is formed and the holding substrate 11 that holds the thin plate.

In addition, the "substrate on which the optical waveguide is formed" includes a substrate obtained by forming a vapor-phase growth film on the holding substrate and by processing the film (thin film) into a shape of the optical waveguide.

As a method of forming the optical waveguide on the substrate 1, a rib type optical waveguide obtained by forming a part corresponding to the optical waveguide to have a protruding shape in the substrate can be formed using a method of etching a substrate part other than the optical waveguide, a method of forming grooves on both sides of the optical waveguide, or the like. Further, in the rib type optical waveguide, a method of thermally diffusing a high-refractive index material such as Ti in the substrate or a method of forming a high-refractive index part using a proton exchange method can be used.

A height of the rib type optical waveguide is set to 1 μm or less, and a width of the rib type optical waveguide is set to 3 μm or less. A spot size converter (SSC) that changes an MFD of the light wave from 1 μm to 3 μm is provided in an input port or an output port of the optical waveguide. Accordingly, even in a case where an MFD of an optical fiber installed outside the optical waveguide device is 10 μm, an optical coupling loss can be suppressed.

In the optical waveguide device of the present invention, as illustrated in FIGS. 2 to 5, the slab waveguide SW is provided close to the rib type optical waveguide 10, and at least a part of the upper surface (SF1, SF2) of the slab waveguide SW has larger roughness than the roughness of the surface of the top portion of the rib type optical waveguide. With this configuration, a unit (hereinafter, referred to as an "unnecessary light beam removing unit") that effectively removes unnecessary light such as a high-order mode light beam while maintaining a fundamental mode light beam with respect to the light wave propagating through the rib type optical waveguide can be formed.

A method of roughening the upper surface of the slab waveguide includes a method of locally forming roughness using an electron beam and a method of roughening the upper surface via etching. As an etching condition for the rough surface, processing is performed under a condition in which roughness is generated compared to a processing condition for the rib top portion. Particularly, since the surface can be simply locally roughened by etching, the rough surface can be formed much more simply than that of the unnecessary light beam removing unit in Patent Litera- ture No. 1. Roughness of the rough surface is preferably 10 nm or larger in arithmetic average roughness Ra. Roughness of an upper surface of the rib type optical waveguide is normally set to 1 nm or less.

In FIG. 2, the slab waveguide SW (SW1) disposed close to the rib type optical waveguide 10 has a shape having a lower height than the rib type optical waveguide. The rough surface is formed on a part (SF1) of the upper surface of the slab waveguide SW, particularly a part close to the rib type optical waveguide 10. The roughness of the surface (SF1) is set to be larger than the roughness of the upper surface (SF0) of the top portion of the rib type optical waveguide 10.

In FIG. 3, a first slab waveguide (SW1) having a lower height than the rib type optical waveguide is provided close to the rib type optical waveguide 10. Furthermore, a second slab waveguide (SW2) that is disposed on a side opposite to the rib type optical waveguide 10 and that has a higher height than the first slab waveguide (SW1) is provided close to the first slab waveguide (SW1). Setting the height of the second slab waveguide to be the same as the height of the rib type optical waveguide can simplify a manufacturing pro- cess. Here, an upper surface (SF2) of the second slab waveguide (SW2) is set to have larger roughness than the upper surface (SF0) of the top portion of the rib type optical waveguide. In FIG. 3, an upper surface of the first slab waveguide (SW1) is not a rough surface.

A clearance G between the rib type optical waveguide and the second slab waveguide (SW2) is set to 1 μm or less and more preferably 0.5 μm or less. In a case where the clearance G is widened, it is difficult to efficiently extract and remove the high-order mode light beam from the light wave propa- gating through the rib type optical waveguide 10. Thus, the clearance G is set close to a predetermined distance or less.

Figure 5:
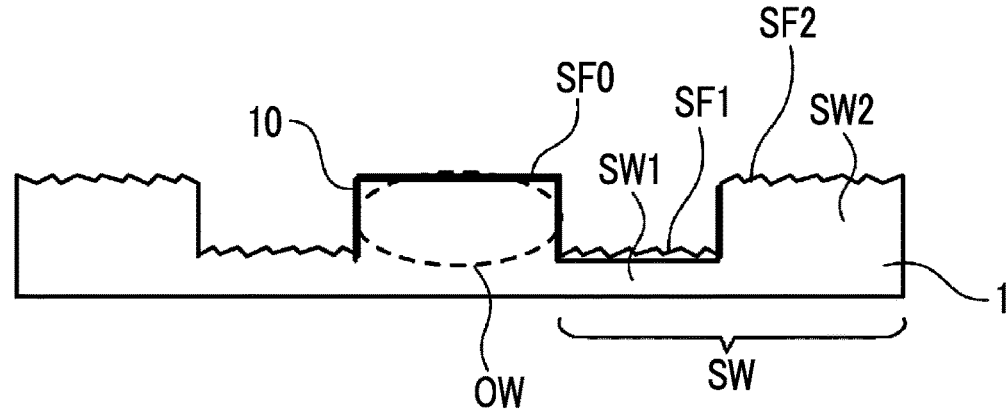
FIG. 5 is a cross section view for describing a fourth example related to the optical waveguide device of the present invention.

In FIG. 4, slab waveguides (SW1, SW1') for removing the unnecessary light such as the high-order mode light beam are formed on both sides of the rib type optical waveguide 10. While the rough surface is not formed on the upper surface of the second slab waveguide in FIG. 4, the rough surface can also be formed on both of the first and second slab waveguides as illustrated in FIG. 5. In addition, of course, slab waveguides on which the rough surface is formed in FIG. 2 or FIG. 3 can be installed on both sides of the rib type optical waveguide 10. Furthermore, setting roughness of the upper surface (SF1) of the first slab waveguide (SW1) to be the same as the roughness of the upper surface (SF2) of the second slab waveguide (SW2) can simplify the manufacturing process.

Figure 6:
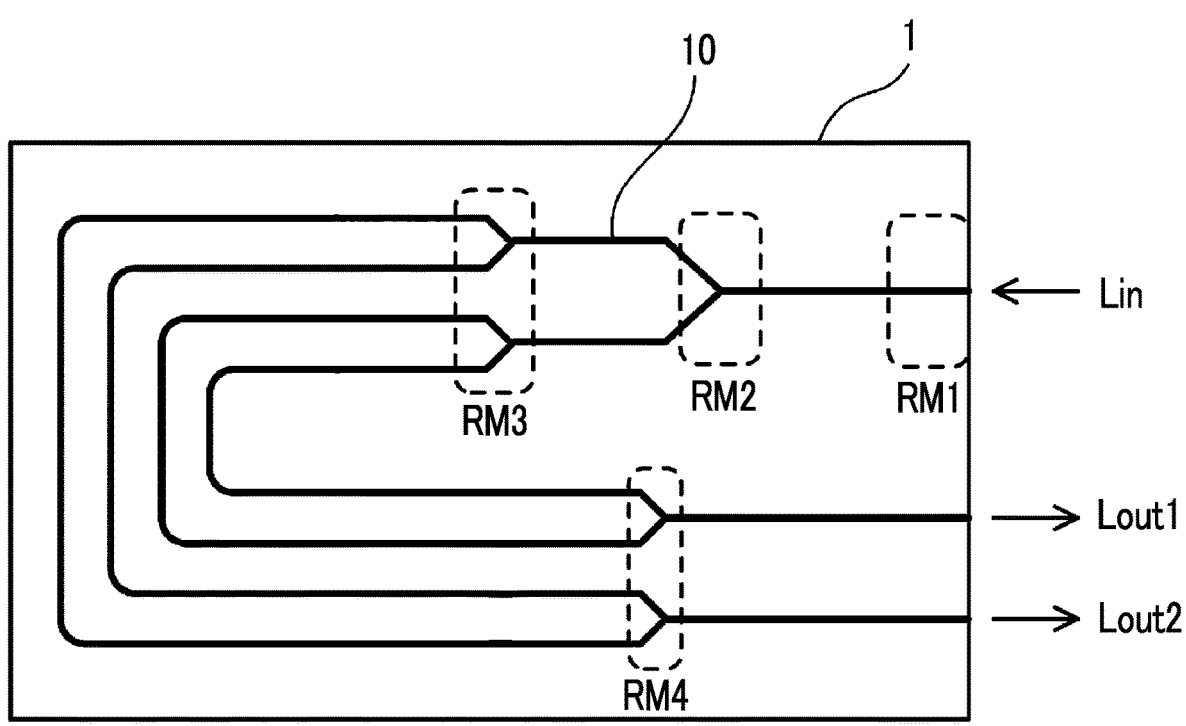
FIG. 6 is a plan view for describing a position at which an unnecessary light beam removing unit is disposed in the optical waveguide device of the present invention.

FIG. 6 is a plan view for describing a location in which the unnecessary light beam removing unit (RM1 to RM4) is disposed. A coupling loss in a case where input light Lin enters the optical waveguide is likely to occur in the input port of the optical waveguide. Thus, since a large amount of the high-order mode light beam is generated in the input port of the optical waveguide, it is preferable to efficiently remove the high-order mode light beam using the unneces- sary light beam removing unit RM1. Reference signs Lout1 and Lout2 are output light.

In addition, it is preferable to effectively remove the high-order mode light beam on a stage before the high-order mode light beam enters a branching part or a Y-junction, in order to appropriately control intensity of branched light or smoothly perform optical combining in the branching part or the Y-junction of the optical waveguide. In addition, the branched light or the optically combined light may include the high-order mode light beam, and the unnecessary light beam removing unit can be provided on a rear stage of the branching part or of the Y-junction. In FIG. 6, the unnec- essary light beam removing unit (RM2 to RM4) can be formed on a front stage or a rear stage of the branching part or of the Y-junction or from the front stage to the rear stage.

Figure 7:
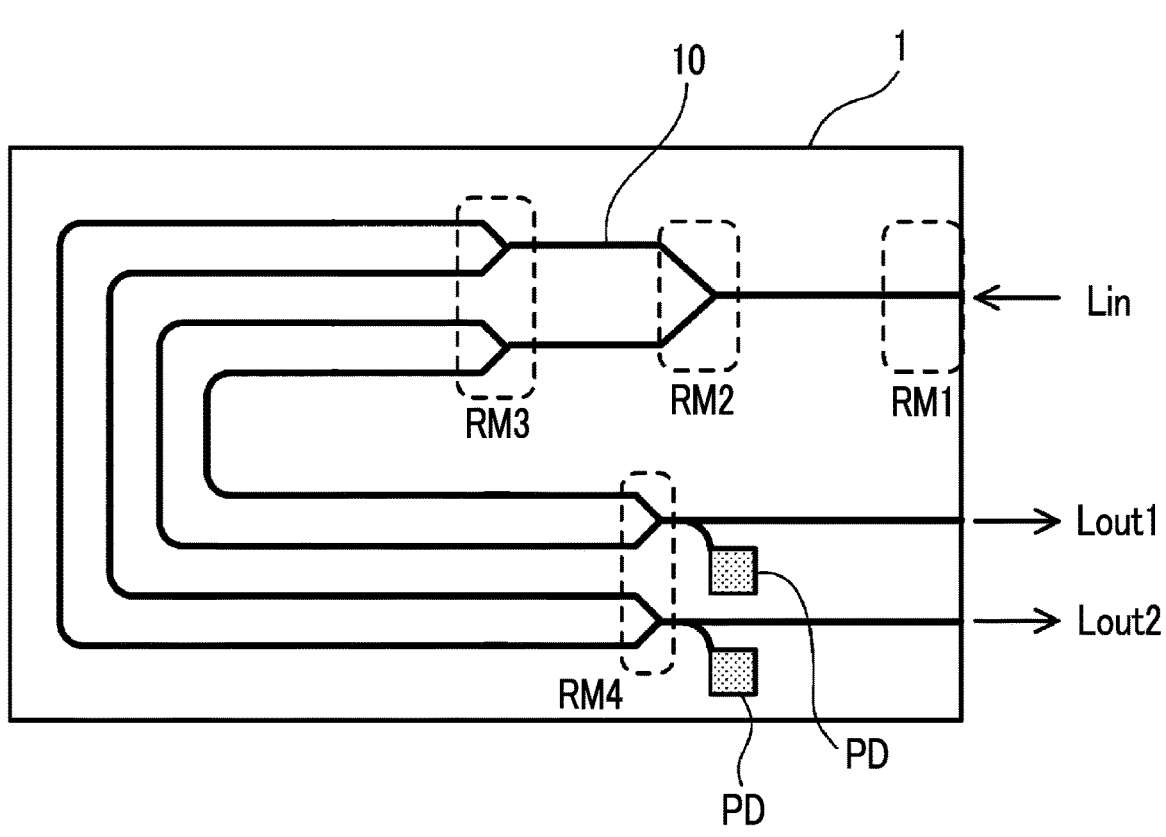
FIG. 7 is a plan view for describing a positional relationship between the unnecessary light beam removing unit and a light-receiving unit in the optical waveguide device of the present invention.

As illustrated in FIG. 7, the input port and the output port of the rib type optical waveguide 10 are disposed on the same end surface (a right end surface of the substrate 1 in FIG. 7) of the substrate. In addition, a photo detection unit (light-receiving element) PD that detects the light wave propagating through the rib type optical waveguide 10 or radiated light radiated from the rib type optical waveguide 10 (Y-junction) is disposed on the substrate 1. In the configuration illustrated in FIG. 7, the unnecessary light that has caused the coupling loss in the input port of the optical waveguide is likely to enter the light-receiving element PD and causes noise. Thus, providing the unnecessary light beam removing unit RM1 in the input port is particularly important. While RM1 is disposed on the end surface of the rib type optical waveguide 10 from the input light Lin in FIG. 7, RM1 may be disposed between the input light Lin and PD.

In addition, RM1 may be provided to block the unneces- sary light radiated from the substrate so that the unnecessary light does not reach the light-receiving element PD.

Furthermore, a part of the high-order mode light beam removed by the unnecessary light beam removing unit is radiated outside the substrate from the rough part on the substrate. Configuring the removed unnecessary light not to be input into the light-receiving element PD is also impor- tant. In FIG. 7, the unnecessary light beam removing units RM2 to RM4 that remove the unnecessary light generated in the branching part and the Y-junction of the rib type optical waveguide 10 are illustrated. Particularly, the unnecessary light beam removing unit RM4 disposed on a front stage of the light-receiving element PD preferably absorbs the unnecessary light using an electrode or the like in order to stabilize operation of a modulator.

Figure 8:
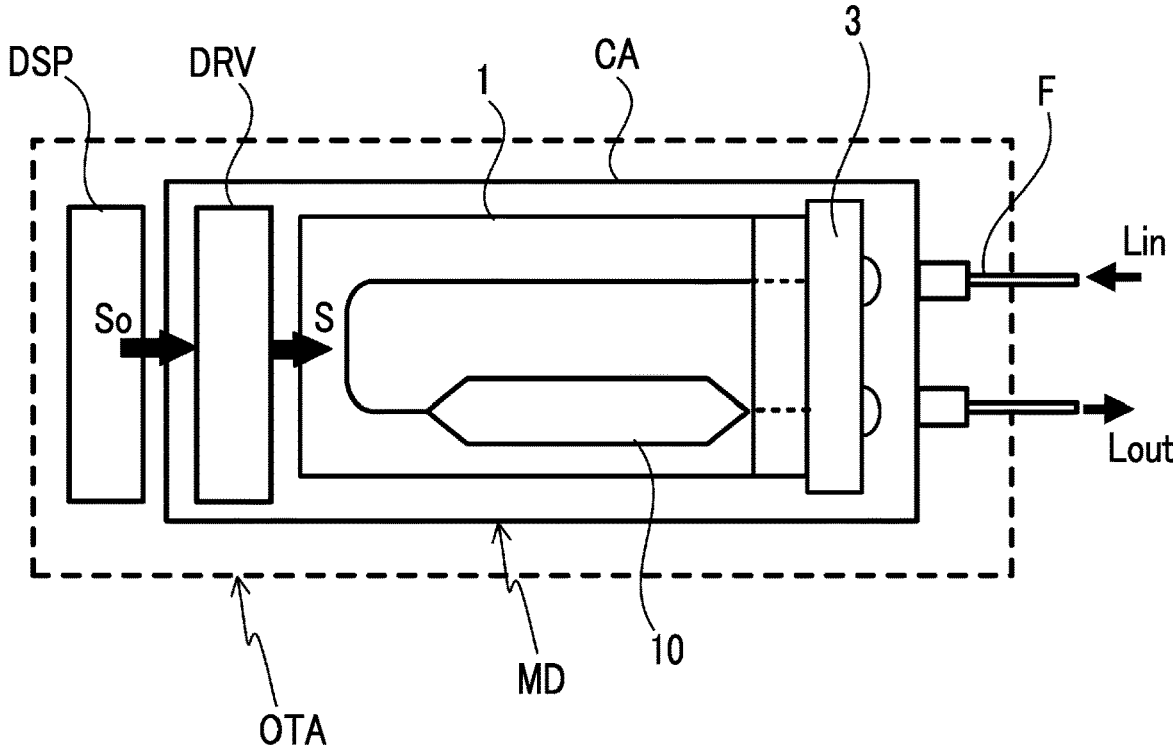
FIG. 8 is a plan view for describing an optical modulation device and an optical transmission apparatus of the present invention.

In the optical waveguide device of the present invention, a modulation electrode that modulates the light wave propa- gating through the optical waveguide is provided in the substrate 1, and the optical waveguide device is accommo- dated inside a case CA as illustrated in FIG. 8. Furthermore, an optical modulation device MD can be configured by providing an optical fiber F through which the light wave is input into or output from the optical waveguide. The optical fiber can not only be disposed outside the case CA as in FIG. 8 but also be disposed to be fixed by introducing the optical fiber into the case through a through-hole that penetrates through a side wall of the case.

An optical transmission apparatus OTA can be configured by connecting, to the optical modulation device MD, an electronic circuit (digital signal processor DSP) that outputs a modulation signal $S_0$ causing the optical modulation device MD to perform a modulation operation. A modulation signal S to be applied to the optical waveguide device is required to be amplified. Thus, a driver circuit DRV is used. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described above, according to the present invention, it is possible to provide an optical waveguide device that can efficiently remove a high-order mode light beam and that is also easily manufactured even in a case where a width or a height of an optical waveguide is small. In addition, an optical modulation device and an optical transmission apparatus using the optical waveguide device can be provided.

REFERENCE SIGNS LIST

1 Substrate
10 Rib type optical waveguide
SW Slab waveguide
SW1 First slab waveguide
SW2 Second slab waveguide
SF0 Upper surface of top portion of rib type optical waveguide
SF1 and SF2 Upper surface of slab waveguide
RM1 to RM4 Unnecessary light beam removing unit
MD Optical modulation device
OTA Optical transmission apparatus

The invention claimed is:

1. An optical waveguide device comprising:
a substrate on which a rib type optical waveguide is formed,
wherein the height of the rib type optical waveguide is 1 μm or less and the width of the rib type optical waveguide is 3 μm or less,
a slab waveguide disposed close to the rib type optical waveguide,
the slab waveguide includes a first slab waveguide that is close to the rib type optical waveguide and that has a lower height than the rib type optical waveguide, and
roughness of an upper surface of the first slab waveguide is higher than roughness of a surface of a top portion of the rib type optical waveguide.

2. The optical waveguide device according to claim 1, wherein the slab waveguide includes the first slab waveguide and

a second slab waveguide that is disposed close to the first slab waveguide on a side opposite to the rib type optical waveguide and that has a higher height than the first slab waveguide, and
roughness of an upper surface of the second slab waveguide is higher than roughness of a surface of a top portion of the rib type optical waveguide.

3. The optical waveguide device according to claim 2, wherein roughness of an upper surface of the first slab waveguide is set to be the same as the roughness of the upper surface of the second slab waveguide.

4. The optical waveguide device according to claim 1, wherein the first slab waveguides are disposed on both sides of the rib type optical waveguide.

5. The optical waveguide device according to claim 2, wherein the first and second slab waveguides of the slab waveguide are disposed on both sides of the rib type optical waveguide.

6. The optical waveguide device according to claim 1, wherein the slab waveguide is disposed near an input port, a branching part, or a multiplexing part of the rib type optical waveguide.

7. The optical waveguide device according to claim 1, wherein an input port and an output port of the rib type optical waveguide are disposed on the same end surface of the substrate,
a photo detection unit that detects a light wave propagating through the rib type optical waveguide or radiation light radiated from the rib type optical waveguide is provided on the substrate, and
the slab waveguide is provided between the input port and the photo detection unit.

8. An optical modulation device comprising:
the optical waveguide device according to claim 1 including an electrode that modulates a light wave propagating through the rib type optical waveguide;
a case accommodating the optical waveguide device; and
an optical fiber through which the light wave is input into the rib type optical waveguide or output from the rib type optical waveguide.

9. The optical modulation device according to claim 8, wherein an electronic circuit that amplifies a modulation signal to be input into the optical waveguide device is provided inside the case.

10. An optical transmission apparatus comprising:
the optical modulation device according to claim 8; and
an electronic circuit that outputs a modulation signal causing the optical modulation device to perform a modulation operation.

11. The optical waveguide device according to claim 2, wherein a clearance between the rib type optical waveguide and the second slab waveguide is set to 1 μm or less.

* * * * *